United States Patent
Simchoni

(12) 
(10) Patent No.: US 6,435,468 B1
(45) Date of Patent: Aug. 20, 2002

(54) ROLLING WEIGHTED BASE

(76) Inventor: Dror Simchoni, Mordechai Ben Hillel 6, Tel Aviv (IL)

(*) Notice: Subject to any disclaimer, the term of this patent is extended or adjusted under 35 U.S.C. 154(b) by 0 days.

(21) Appl. No.: 09/696,223

(22) Filed: Oct. 26, 2000

(51) Int. Cl.$^7$ ............................................... F16M 13/00
(52) U.S. Cl. ...................................... 248/519; 248/529
(58) Field of Search .................. 248/129, 511, 248/519, 523, 529, 346.3, 188.7; 280/62; 26/498

(56) References Cited

U.S. PATENT DOCUMENTS

| | | | |
|---|---|---|---|
| 2,479,720 A | | 8/1949 | Brandt .................. 248/123.2 |
| 3,078,063 A | * | 2/1963 | Frankl ...................... 248/511 |
| 3,188,033 A | * | 6/1965 | Groves ...................... 248/511 |
| 3,560,501 A | | 2/1971 | Walker ...................... 544/283 |
| 4,911,391 A | * | 3/1990 | Ellis ........................ 248/188.7 |
| 4,944,292 A | * | 7/1990 | Gaeke et al. .......... 128/240.18 |
| 5,402,973 A | * | 4/1995 | Haines ................... 248/188.7 |
| 5,429,378 A | * | 7/1995 | Durel-Crain ............ 280/43.22 |
| 5,433,409 A | * | 7/1995 | Knopp ...................... 248/161 |
| 5,533,604 A | * | 7/1996 | Brierton ............... 193/35 MD |
| 5,769,436 A | | 6/1998 | Andrey .................... 280/47.17 |
| 5,957,145 A | | 9/1999 | Plumer ........................ 135/16 |
| 6,116,555 A | * | 9/2000 | Claus et al. ............. 248/188.7 |
| 6,290,191 B1 | * | 9/2001 | Hendricks et al. ....... 248/128.1 |

FOREIGN PATENT DOCUMENTS

| | | |
|---|---|---|
| DE | 3226482 A1 | 1/1984 |
| DE | 19718627 A1 | 2/1997 |
| EP | 530 994 A1 | 3/1993 |
| JP | 225812 | 8/1999 |

OTHER PUBLICATIONS

Kosasayama et al., Cyclic Guanidines, Chem. Pharm Bull., 27(4), pp. 880–892 (1979).
Ishikawa et al., Cyclic Guanidines, Chem. Pharm Bull., 28(5), pp. 1357–1364 (1980).

* cited by examiner

Primary Examiner—Leslie A. Braun
Assistant Examiner—J Szumny
(74) Attorney, Agent, or Firm—Mark M. Freidman

(57) ABSTRACT

A rolling weighted base for supporting an object and for facilitating the movement of the object along a surface, the base connected to the object by a vertical shaft, the base comprising: at least three weight balls; a housing configured to receive the vertical shaft and to hold the at least three balls rigidly spaced apart so that the at least three balls do not touch each other, the at least three balls partially protruding from said housing toward the hard surface and free to rotate inside the housing.

9 Claims, 6 Drawing Sheets

ROLLING WEIGHTED BASE

FIELD AND BACKGROUND OF THE INVENTION

The present invention relates to movable weighted bases used to support objects such as large umbrellas, lighting assemblies, lamps, TV monitors, music speakers, laundry hangers, Christmas trees, etc. and to facilitate transportation of these objects along hard surfaces such as concrete, stone, brick or hardwood floors.

Large umbrellas are often used outdoors in places such as backyards, restaurants and public pools, where they are placed on a hard surface and supported by a stationary weighted base. The base is normally formed of concrete, metal or a hollow plastic enclosure filled with a material that imparts weight, for example water, sand, or rock. The base is provided with a circular socket that receives a vertical shaft of the umbrella. A large umbrella, with a canopy diameter that can reach 2–4 meters, needs a heavy base for support, particularly in windy conditions. The base may weigh many tens of kilograms, and is often too heavy to be moved by one person. Obviously, moving around the umbrella and the base together is even more difficult. Solutions to this problem often include improvised ways such as wiggling the umbrella and base in a pendulum motion while pulling it across the surface, or using two persons to carry it from place to place.

Lighting assemblies, such as those used in television studios have a different problem. The assemblies include a vertical pole connected to a base, for example a tripod base. Although the assembly itself is not normally too heavy, it has to be extremely stable in use, and often the base cannot supply the required stability. In such cases, sandbags hanged on horizontal members connected to the pole often weigh down the lighting assembly. This is a cumbersome operation, with the sandbags often carried separately when the assembly is moved.

Moveable bases which support umbrellas, lamps, lighting or other objects connected to the base by a vertical shaft are known in the art. Examples include the extension lamp support of U.S. Pat. No. 2,479,720 to Brandt, and the movable umbrella of U.S. Pat. No. 5,957,145 to Plumer. These prior art bases are based on wheeled devices, in which the wheels do not provide the stabilizing weight. The wheels are normally part of a more complex structure, which, as in the case of U.S. Pat. 5,957,145 includes a stabilizing frame and a carrying handle. In contrast with the present invention, these prior art bases do not combine compactness, weight, stability and full 360 degrees movement capability along the underlying surface.

Rolling elements such as ball transfer units are well known in the art. These elements are normally used in loading systems, conveyor platforms for moving cargo, etc. The balls in these ball transfer units do not function as principal weight elements, and do not serve as the stabilizing structure itself.

There is thus a widely recognized need for, and it would be highly advantageous to have, a movable weighted base that is simple to manufacture and assemble, easy to operate, compact, and stable.

SUMMARY OF THE INVENTION

The present invention relates to movable weighted bases such as those used to hold and support large umbrellas on hard surfaces such as concrete floors. Particularly, the present invention discloses a rolling weighted base, in which spherical rolling elements, similar in principle to ball transfer units, provide the bulk of the base weight. The rolling weighted base of the present invention is compact and stable, has full 360° movement capability along the surface, and is configured to receive a vertical shaft of objects such as a large umbrella, a heavy lighting or lamp stand, etc. The base of the present invention is particularly useful for supporting such objects in their normal use, and for easily moving such objects around on hard surfaces, obviating the need for lifting and carrying the objects. The specification refers hereafter to "umbrellas" as exemplary objects that can be supported and moved around on a hard surface by the weighted base of the present invention. However, the disclosed rolling weighted base is obviously useful for supporting and moving around any object supported by a vertical shaft, in particular objects such as lighting assemblies, lamps, TV monitors, music speakers, laundry hangers, and Christmas trees.

According to the present invention there is provided a rolling weighted base for supporting an object and for facilitating the movement of the object along a hard surface, the base connected to the object by a vertical shaft, the base having a total weight, the base comprising: a) at least three weight balls having a combined weight greater than half the total base weight; and b) a housing configured to receive the vertical shaft and to hold the at least three balls rigidly spaced apart so that the at least three balls do not touch each other, the at least three balls partially protruding from the housing toward the hard surface, the at least three balls free to rotate inside the housing.

According to a further feature of the present invention, the housing includes individual housing units for each of the at least three weight balls.

According to a further feature of the present invention, the at least three balls are of equal size.

According to a further feature of the present invention, the at least three balls are spaced apart at an equal angle to each other.

According to a further feature of the present invention, the configuration of the housing to receive the vertical shaft includes a socket According to a further feature of the present invention, the housing is configured to support an object chosen from the group consisting of an umbrella, a lighting assembly, a lamp, a TV monitor, a music speaker, a laundry hanger and a Christmas tree.

According to a further feature of the present invention, the weight balls include bowling type balls.

According to a further feature of the present invention, the free rotation of the at least three balls inside the housing is facilitated by ball bearings.

According to a further feature of the present invention, the base further comprises means for quick assembly and disassembly of the individual housings.

The present invention successfully addresses the shortcomings of the presently known configurations by providing a rolling weighted base which is simple to manufacture and assemble, easy to operate, compact, and stable

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a rolling weighted base in which spherical rolling elements provide the bulk of the base weight. The rolling weighted base of the present invention is configured to receive a vertical shaft of objects such as a large umbrella, a heavy lighting or lamp stand, etc. The weighted base of the present invention is compact and imparts stability to the object it supports. An umbrella or similar object supported by the rolling weighted base can easily be moved along a hard surface in any direction parallel to the surface. The base of the present invention thus obviates the need for lifting and carrying an object such as a heavy umbrella or light stand.

The principles and operation of a rolling weighted base according to the present invention may be better understood with reference to the drawings and the accompanying description.

Figure 1:
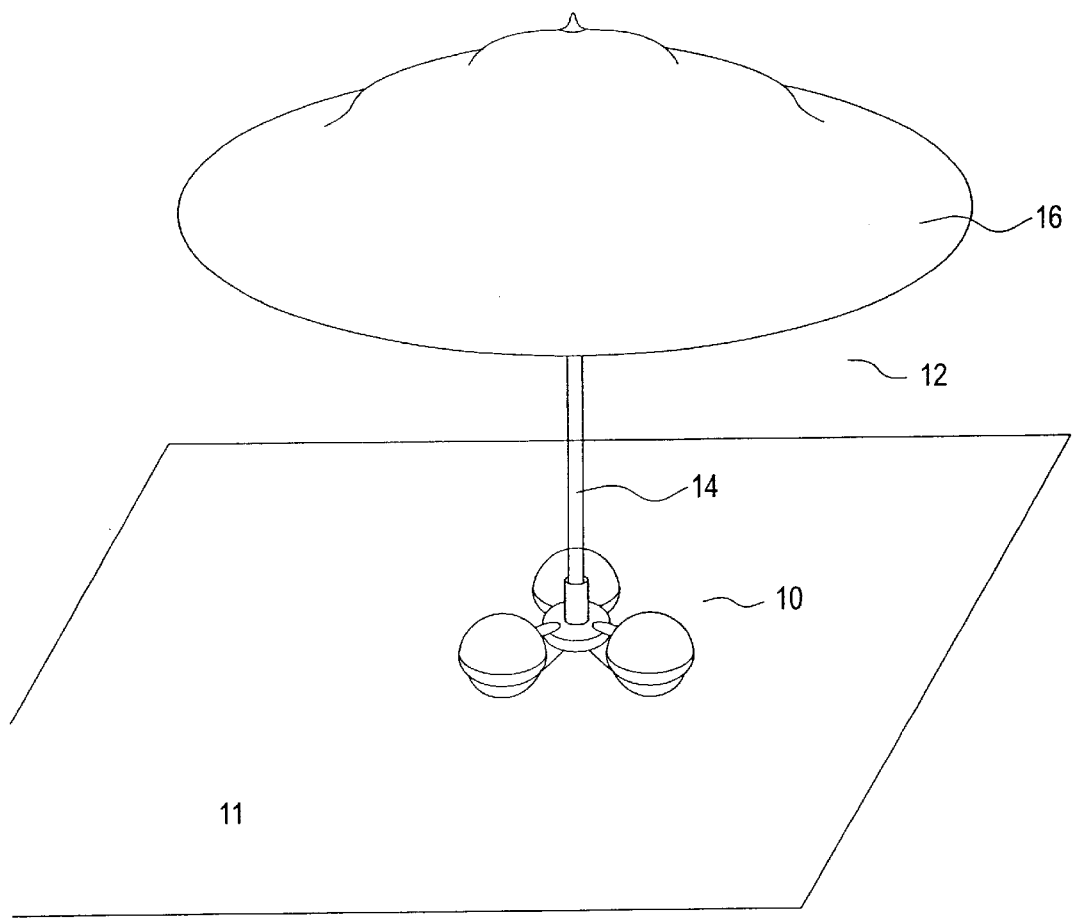
FIG. 1 is a perspective view of the rolling weighted base of the present invention supporting an umbrella.

Referring now to the drawings, FIG. 1 illustrates a preferred embodiment of a "three-ball" rolling weighted base, generally designated 10, positioned on a hard underlying surface 11, and supporting an object 12 having a vertical shaft 14. Preferably, object 12 is a large umbrella having a canopy 16. More generally, object 12 can be any object that in normal use is mounted on, or naturally has, a vertical shaft like shaft 14, for example a lamp, a lighting assembly, a Christmas tree, etc. Such objects need a stable base for operation, and often need to be moved around on a hard surface (for example on floors in studios, exhibition halls, etc.).

Figure 2:
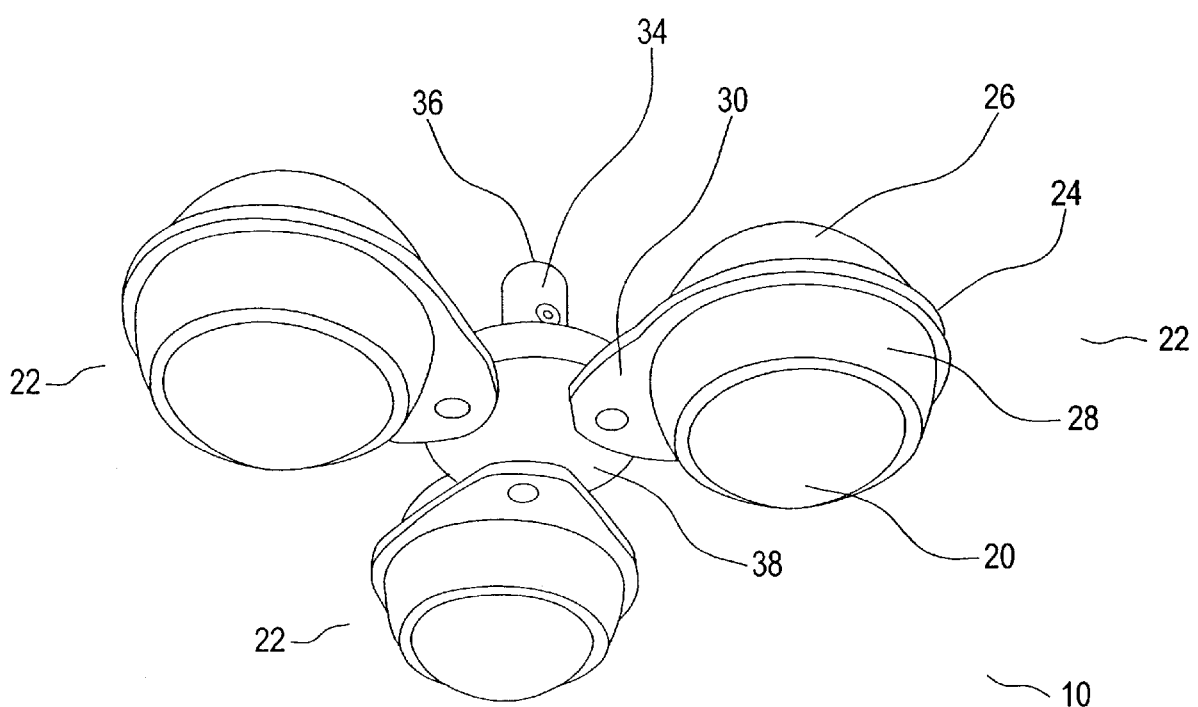
FIG. 2 is a bottom perspective view of a three-ball embodiment of the rolling weighted base of the present invention.
Figure 3:
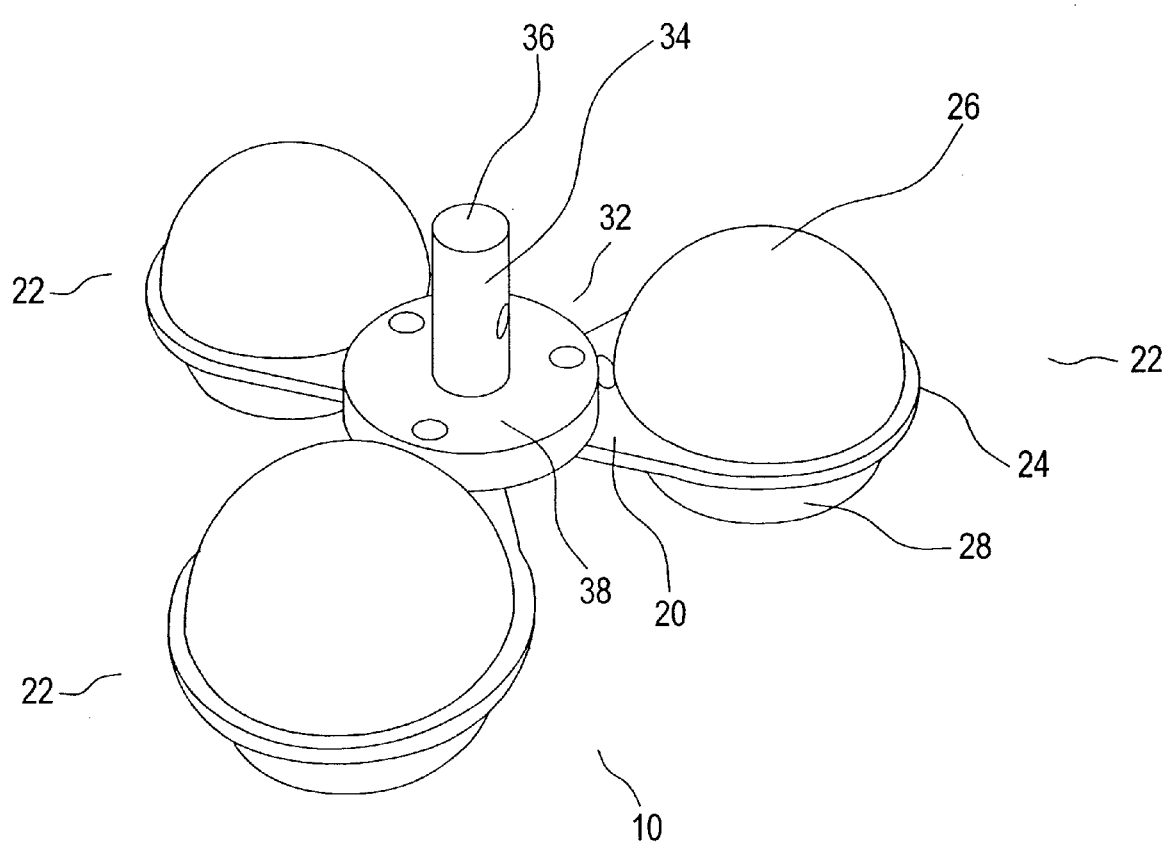
FIG. 3 is a top perspective view of a three-ball embodiment of the rolling weighted base of the present invention.

FIGS. 2 and 3 show more detailed views from two angles of the "three-ball" configuration of base 10. Base 10 includes three weight balls 20, preferably of equal size, each ball partially contained in an individual housing unit 22, at least a portion of each ball protruding from its housing, the protruding section engaged to contact surface 11. The weight of balls 20 constitutes the bulk (i.e. more than half, and preferably in the range of 51% to 90%) of the total weight of base 10. Preferably, each housing unit 22 is internally spherical to conform to ball 20. Preferably, each housing unit 22 consists of a truncated spherical envelope 24 divided into two parts, an upper hemisphere 26 and a truncated lower hemisphere 28.

Figure 4:
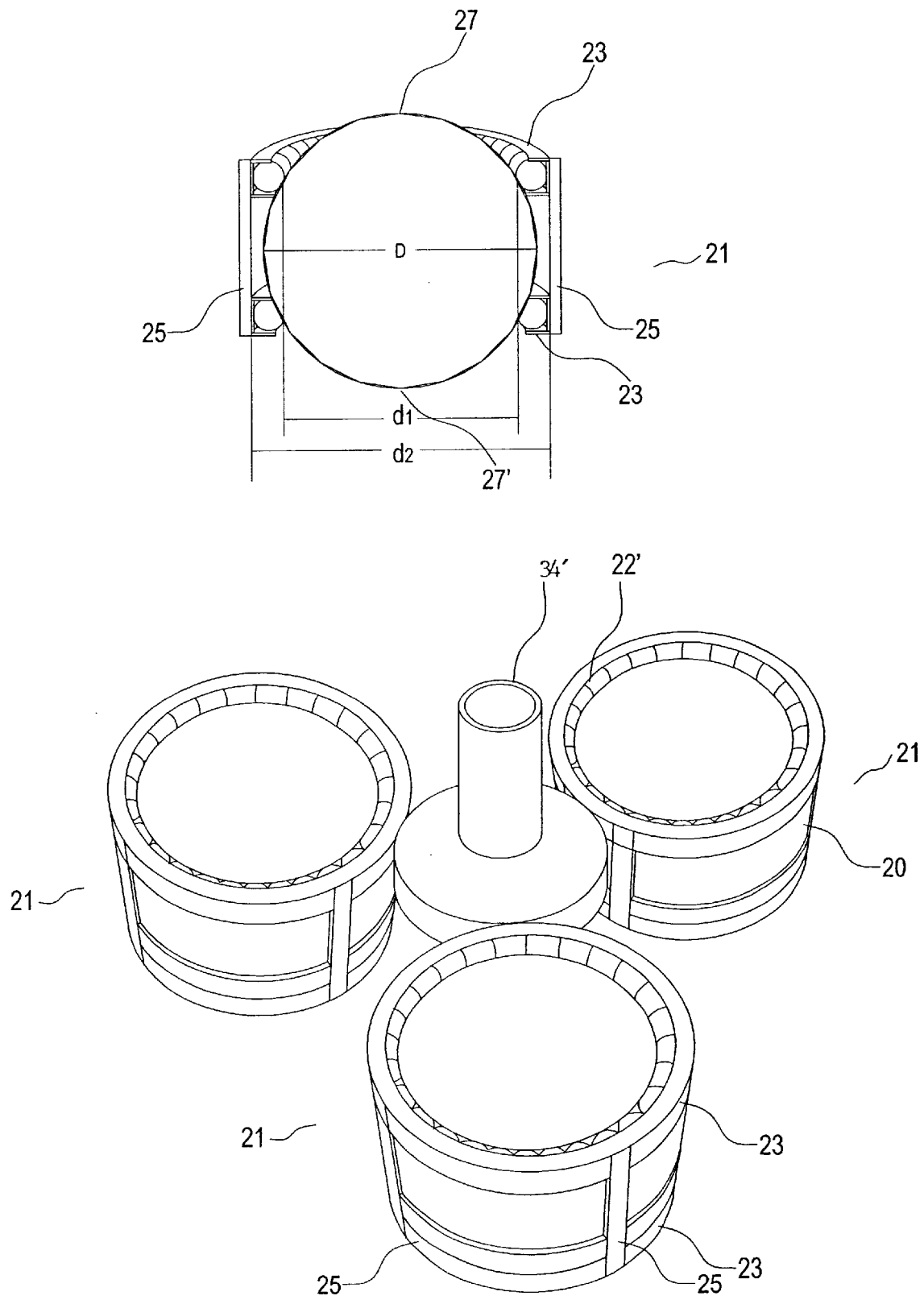
FIG. 4 is a perspective view of a "one-housing" embodiment in which three ball-containing "cages" are assembled into a rolling weighted base.

An alternative, "one piece" housing for three balls is shown in FIG. 4. As also shown separately in cross-section, each ball 20 is contained in a free-rotating encasing mechanism 21 in the form of a "cage" (hereafter referred to as cage 21), which includes two ball bearings 23 each having an internal diameter $d_1$ smaller than the diameter D of ball 20, and an external diameter $d_2$ larger than D. Cage 21 also includes two or more bars 25 which connect the two bearings 23 rigidly and substantially in parallel planes, at their external surfaces defined by $d_2$. Ball 20 is thus both contained in cage 21 and free to rotate in any direction. Ball 20 protrudes from cage 21 at a ball top 27 and a ball bottom 27'. To form the base, three cages 21 are connected rigidly to each other, with the bearing planes substantially horizontal and aligned laterally, so that the balls do not touch each other. The rigid connection is such that bottoms 27' protrude equally and can touch a level surface such as surface 11 while keeping bars 25 substantially vertical. In the embodiment of FIG. 4, a "housing" 22' is now the rigid assembly of three cages 21, preferably covered by a single envelope (not shown). "Housing" as used in this specification is therefore an inclusive term that describes both the assembly of individual housing units 22 as described in FIGS. 2,3 and the "one-piece" housing 22' embodiment of FIG. 4. However, for illustration purposes and for easier understanding only, the description below is restricted to individual housings.

Ball 20 is secured within, and is free to rotate in its housing. Means that provide such securing and free rotation (in addition to the example of FIG. 4) are known in the art, and appear for example in ball transfer units. U.S. Pat. No. 5,533,604 to Brierton describes such a ball transfer unit shaped externally as a cube, which includes a prismatically shaped cube housing, a bearing race, small ball bearings, a main ball bearing and a housing cap. The main ball bearing is similar to ball 20 of the present invention, the housing and cap in U.S. Pat. 5,533,604 form an enclosure for the ball similar to hemispheres 26 and 28 herein, and the small ball bearings provide the free rotation of the main ball bearing within the housing. Many other ball transfer configurations are known in the art, and can be used in the rolling weighted base of the present invention. Many of the prior art ball transfer units also include means for preventing dirt from entering the housing and damaging the ball bearings. In the rolling weight base of the present invention, the need for such means is reduced, because the protruding portion of each ball 20 faces downward toward surface 11.

When positioned on surface 11 (FIG. 1), base 10 is horizontal in the sense that for equal-size balls, all three balls have equal diameters, and their centers of gravity are at an equal height above surface 11. Alternatively, one of the three balls may have a different size, in which case their rigid connection is adjusted to ensure that all three bottoms 27' (FIG. 4) form one plane that is at a right angle with shaft 14. The three-ball configuration is particularly preferable because of its simplicity and cost effectiveness, however four-ball, five-ball, etc, configurations are clearly possible and fall within the scope of the present invention. As explained above, each ball 20 is secured inside a housing and each ball is free to rotate in any angular direction inside its housing, allowing free movement of the base in any direction in a plane parallel with the underlying surface. Balls 20 are preferably similar to billiard or bowling-type balls and can be made by simple and cost effective methods such as injection molding of materials that impart to each ball adequate weight for its particular use. Examples of such materials include hard plastics and hard rubber. Balls 20 provide the bulk of the base weight. The weight of each ball typically ranges from about one kilogram to about 20 kg, depending on the use of the base. The weight is related to the ball diameter or size through the specific weight of the ball material. The typical range above is provided as a guide only, and is not meant to be limiting. The base weight, particularly with heavier balls, creates enough friction with the hard surface to prevent unwanted rolling of the base and supported object. Optionally, the base can be provided with locking means (not shown) to prevent unwanted rolling.

Figure 5:
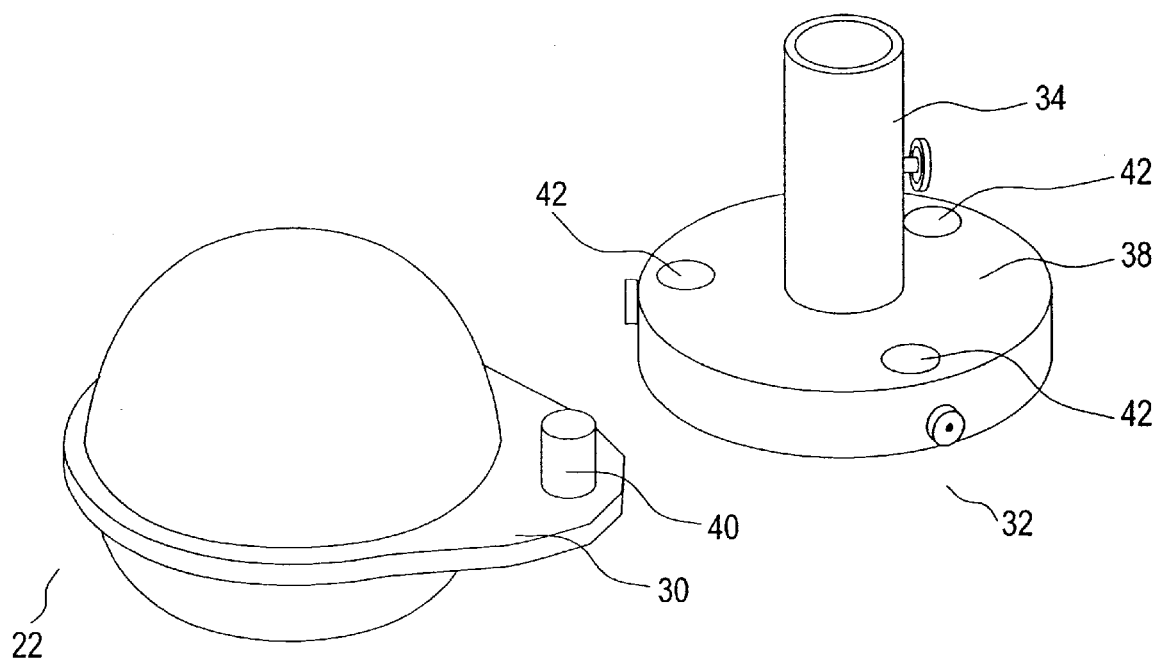
FIG. 5 is a perspective view of a preferred embodiment of a housing unit according to the present invention.

In one embodiment, the base is constructed as one integral piece, i.e. in a permanent configuration, as shown for example in FIG. 4. Preferably, the base is constructed in a modular configuration, in which three or more identical basic units, each basic unit including a ball and its housing unit, can be easily assembled to form the base, and disassembled for easier transportation. Such modularity greatly enhances the versatility of the base, because basic units can be carried around easier than a permanently assembled or permanently configured base. In FIGS. 2 and 3, envelope 24 preferably has an outwardly projecting flange 30. Flange 30 may be implemented in either of hemispheres 26 or 28, or in both, and serves to connect the three housing units 22 to a socket mechanism 32. Preferably, mechanism 32 includes a cylindrical socket 34 open at a top end 36 and closed at a wider circular bottom end 38. Socket 34 serves as receptor for, and holds vertical shaft 14 (FIG 1). Thus, the housing is configured to receive the vertical shaft of the object supported by the base. Preferably, a socket 34' similar to socket 34 is also rigidly attached to housing 22' in FIG. 4. In normal use, when base 10 is horizontal as defined above, socket 34 is vertical. Preferably, as shown in FIG. 5, flange 30 includes a short vertical cylindrical peg 40, which can be inserted into a fitting hole 42 in end 38 of mechanism 32, to allow quick assembly and disassembly of each housing unit 22 and mechanism 32. Thus, an element such as peg 40 is particularly useful in a modular configuration of the base, although it can be equally useful for aligning and strengthening the base in a permanent configuration. The combination of flange 30 and peg 40 is a particularly useful example of means for "quick assembly", for assembling and disassembling a modular base. In the three-ball configuration of FIGS. 1–4, the housings are spaced apart at an "inter-housing" angle of 120 degrees. An equal angular spacing between the balls is particularly advantageous from the point of view of symmetry, stability and simplicity; however, a non-equal spacing between the balls is also possible. More generally, in four-ball configurations the inter-housing angle is 360°/4=90°, in "five-ball" configurations it is 72°, etc.

Figure 6:
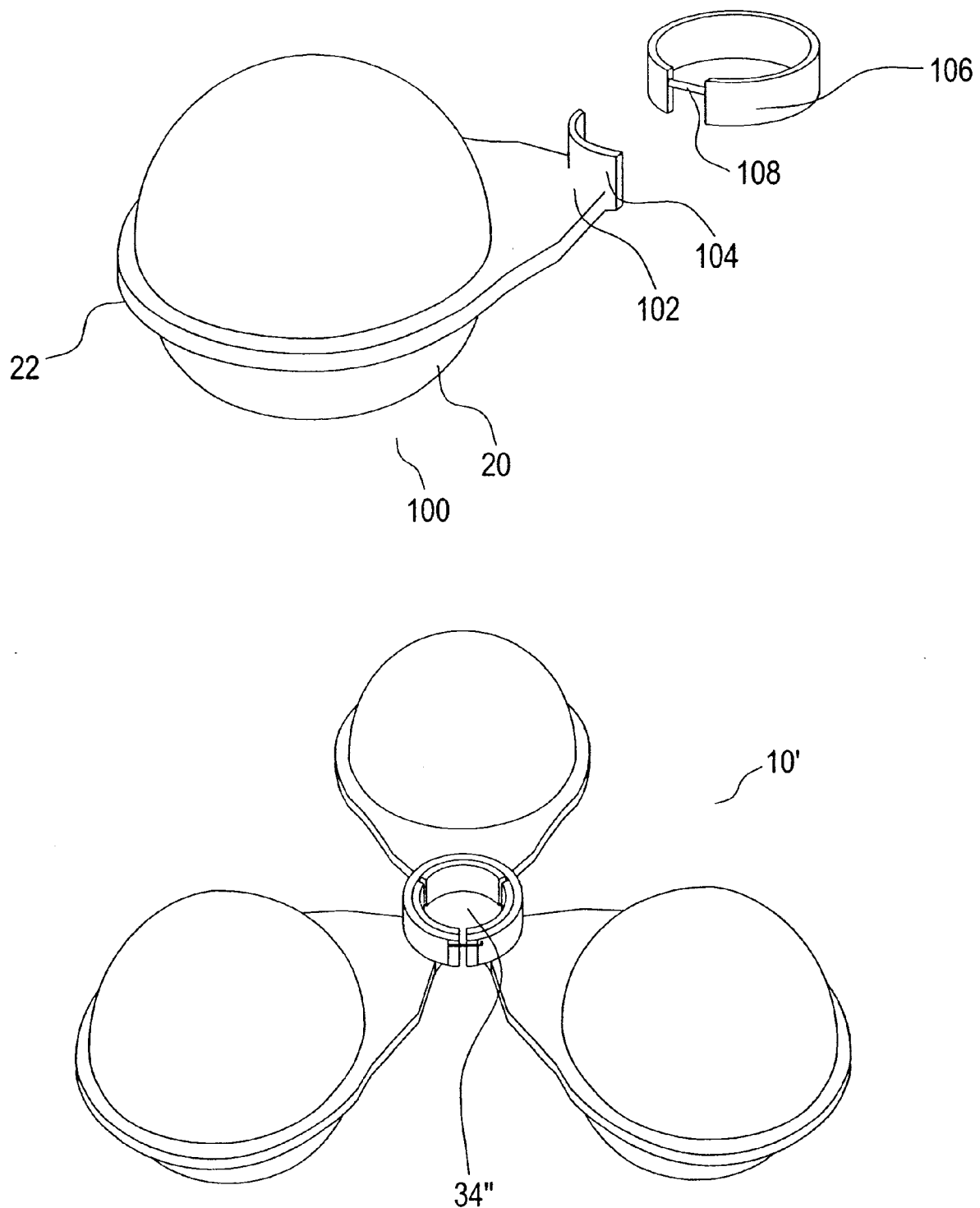
FIG. 6 is a perspective view of another preferred embodiment of a housing unit according to the present invention.

An alternative basic unit 100 of ball 20 and housing unit 22 which is useful to form a three-base modular base configuration 10' is shown in FIG. 6.

Housing unit 22 has attached to an end 102 of its flange 30 a third of a longitudinal section of a tube 104, referred to hereafter a "partial"tube. Three units 100 are assembled so that their partial tube sections meet and form a full tube 34", which replaces functionally socket 34 of FIGS. 1–3. A clamping mechanism such as a clamp 106 having an adjustable clamping device 108 is used to clamp the three partial tubes together to form full tube 34", and to impart good mechanical strength and stability to base 10'. One advantage of basic units 100 is that they simplify the structure and reduce the complexity of base 10' by removing the need for additional parts such as mechanism 32 in FIGS. 1–3. Another advantage is that they allow a larger degree of freedom in the diameter of vertical shaft 14 that can be inserted in tube 34".

While the invention has been described with respect to a limited number of embodiments, it will be appreciated that many variations, modifications and other applications of the invention may be made.

What is claimed is:

1. A rolling weighted base for supporting an object and for facilitating the movement of the object along a hard surface, the base adapted to be connected to the object by a vertical shaft, the base comprising:
   a. at least three weight balls having a combined weight greater than half the total base weight, and
   b. a housing containing said three balls and configured to receive the vertical shaft, said at least three balls partially protruding from said housing toward the hard surface and being free to rotate in any angular direction inside said housing, whereby said at least three balls through their combined weight are the major contributor to stabilize the base and hence the object.

2. The base of claim 1, wherein said housing further includes a respective cage holding each of said at least three weight balls, wherein said housing includes a socket mechanism configured for receiving the vertical shaft, and wherein said connection of said at least three balls held in said respective cages and equally spaced apart is obtained through the direct and permanent attachment of said cages to said socket mechanism.

3. The base of claim 1, wherein said combined weight greater than half the total base weight includes a combined weight between 51 percent and 90 percent of said total base weight.

4. The base of claim 1, wherein said at least three balls are of equal size.

5. The base of claim 1, wherein said at least three balls are spaced apart at an equal angle to each other.

6. The base of claim 1, wherein the object is chosen from the group consisting of an umbrella, a lighting assembly, a lamp, a TV monitor, a music speaker, a laundry hanger and a Christmas tree.

7. The base of claim 1, wherein said balls are bowling type balls.

8. The base of claim 1, wherein said housing includes:
   (a) at least three housing units, each of said housing units containing one of said weight balls;
   (b) a central portion providing a socket for receiving the vertical shaft; and
   (c) attachment means for releasably attaching said housing units to said central portion.

9. A method for forming a rolling weighted base, the base used for supporting an object and for facilitating the movement of the object along a hard surface, the base adapted to be connected to the object by a vertical shaft, the method comprising:
   a. providing at least three weight balls having a combined weight greater than half the total base weight, and
   b. providing a housing containing said three balls and configured to receive the vertical shaft, said at least three balls partially protruding from said housing toward the hard surface and being free to rotate in any angular direction inside said housing, whereby said at least three balls through their combined weight are the major contributor to stabilize the base and hence the object.

* * * * *